(12) United States Patent
Pisczak

(10) Patent No.: US 6,892,990 B2
(45) Date of Patent: May 17, 2005

(54) MODULAR CABLE SUPPORT APPARATUS, METHOD, AND SYSTEM

(75) Inventor: Philip J. Pisczak, Chagrin Falls, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 10/114,173

(22) Filed: Apr. 2, 2002

(65) Prior Publication Data

US 2003/0183733 A1 Oct. 2, 2003

(51) Int. Cl.[7] .................................................. F16L 3/08
(52) U.S. Cl. ....................................... 248/74.4; 248/62
(58) Field of Search ....................... 24/279, 24; 16/388; 403/344; 285/420, 367; 248/218.4, 219.3, 219.4, 74.4, 63, 61, 62, 67.5; 174/45 R, 41, 149 R, 40 R

(56) References Cited

U.S. PATENT DOCUMENTS

| | | |
|---|---|---|
| 1,063,852 A | 6/1913 | Carpenter et al. |
| 1,638,230 A | 8/1927 | Alsaker |
| 1,769,891 A | 7/1930 | Steinmayer |
| 1,991,690 A | 2/1935 | McCoy |
| 2,550,001 A | 4/1951 | Button |
| 2,651,766 A | 9/1953 | Runde |
| 2,779,815 A | 1/1957 | Sokol |
| 2,887,669 A | 5/1959 | Sylvester |
| 2,975,997 A | 3/1961 | Lindsey |
| 2,984,441 A | 5/1961 | Dalmasso |
| 3,026,368 A | 3/1962 | Lindsey |
| 3,431,538 A | 3/1969 | Hubbard et al. |
| 3,437,742 A | 4/1969 | Lindsey |
| 3,553,351 A | 1/1971 | Lindsey |
| 3,633,858 A | 1/1972 | Houston |
| 4,131,257 A | * 12/1978 | Sterling ..................... 248/67.5 |
| 4,281,213 A | 7/1981 | Sciscione |
| 4,383,668 A | 5/1983 | Hall |

(Continued)

FOREIGN PATENT DOCUMENTS

| | | |
|---|---|---|
| CA | 576602 | 5/1959 |
| DE | 37 08 065 | 9/1988 |
| JP | 2002-188757 | * 7/2002 |

OTHER PUBLICATIONS

Transmission & Distribution Product Catalog of Preformed Line Products, Jul. 1999: pp. 157–168—Section 4 Attachment Hardware for Special Conductors—Helical Products for T–2 Conductor; Cushion–Grip Clamp for T–2; Oval Conductor Products.

(Continued)

Primary Examiner—Gwendolyn Baxter
(74) Attorney, Agent, or Firm—Fay, Sharpe, Fagan, Minnich & McKee, LLP

(57) ABSTRACT

A cable support system includes a plurality of first components (12) and a plurality of second components (14). Each first component (12) has a hinge edge (16), a tightening region (18) disposed on an opposite side from the hinge edge (16), a cable channel (20) arranged between the hinge edge (16) and the tightening region (18), and an interconnecting structure (22). Each second component (14) has a hinge edge (24), a tightening region (26) disposed on an opposite side from the hinge edge (24), and a cable channel (28) arranged between the hinge edge (24) and the tightening region (26). A first cable support device (10) is constructable by hingeably combining selected first and second components (12, 14) via the hinge edges (16, 24). A second cable support device (100) is constructable by hingeably combining selected two second components (14) via the hinge edges (24).

68 Claims, 11 Drawing Sheets

U.S. PATENT DOCUMENTS

| | | | |
|---|---|---|---|
| 4,393,998 A | | 7/1983 | Allen et al. |
| 4,570,884 A | * | 2/1986 | Armbruster ................ 248/68.1 |
| 4,995,753 A | | 2/1991 | Shook |
| 5,014,941 A | | 5/1991 | Sherman |
| 5,184,794 A | * | 2/1993 | Saito ......................... 248/68.1 |
| 5,195,704 A | * | 3/1993 | Louie ........................ 248/67.5 |
| 5,435,507 A | | 7/1995 | Murphy |
| 5,445,348 A | * | 8/1995 | Caldwell et al. ........... 248/74.1 |
| 5,494,245 A | | 2/1996 | Suzuki et al. |
| 5,622,341 A | * | 4/1997 | Stana ........................ 248/74.1 |
| 5,689,862 A | | 11/1997 | Hayes et al. |
| 5,711,639 A | * | 1/1998 | Tessier et al. .............. 405/171 |
| 5,752,680 A | * | 5/1998 | Mann .......................... 248/63 |
| 5,893,538 A | | 4/1999 | Onishi et al. |
| D414,404 S | * | 9/1999 | van de Lande .............. D8/396 |
| 6,030,006 A | | 2/2000 | Lin |
| 6,065,251 A | * | 5/2000 | Kindrick ..................... 52/36.4 |
| 6,135,398 A | | 10/2000 | Quesnel |

OTHER PUBLICATIONS

Transmission & Distribution Product Catalog of Preformed Line Products, Jul. 1999: pp. 289–301—Section 11 Fiber Optic Products—Fiber Optic Product Layout—ADSS and OPGW; FIBERLIGN® Dead-end for OPGW; FIBERLIGN® Suspension for OPGW; FIBERLIGN® Formed Wire Dead-end for OPGW; FIBERLIGN® Cushion Clamp for OPGW.

* cited by examiner

MODULAR CABLE SUPPORT APPARATUS, METHOD, AND SYSTEM

BACKGROUND OF THE INVENTION

The present invention relates to the cable support arts. It particularly relates to supporting and suspending cables from poles or other overhead support structures, and will be described with particular reference thereto. The invention will also find application in conjunction with various types of cables such as telephone cables, cables for "cable" television, high tension wires, fiber optical cables, and optical ground wires (OPGW's). In addition to suspending cables from poles and the like, the present invention is operative with flat support surfaces and, accordingly finds use in supporting cables and other objects in vault and other similar or related applications.

Power lines, telephone transmission lines, and other cables are frequently suspended aerially from a plurality of poles or other support structures. An aerial cable arrangement is relatively simple and flexible, and has a limited ground footprint that frequently permits space substantially below the suspended cables to be used for other purposes. An aerial arrangement also vertically separates the cables from people or roaming ground animals and reduces the possibility of detrimental contact therewith. Spatial separation is particularly useful for electrical power transmission cables for safety reasons. Aerial suspension of a cable also helps reduce damage caused either inadvertently or through malicious vandalism.

Although aerial cables are relatively safe from ground-based sources of damage, they are subject to environmental wear and damage, principally due to winds. Well known in the art are problems caused by aeolian vibration which is a high frequency, low amplitude vibration caused by laminar winds passing across the line, as well as "galloping" which is a low frequency, high amplitude wind-induced cable motion. Wind action can produce cable damage in the form of abrasion, wear, and fatigue, especially at the suspension points where cable support devices inherently form mechanical stress points in the cable. The potential for such damage can be increased by excessive clamping force, by inadequate clamping force which allows the cable to slide within the clamp, or by an uneven or non-uniform clamping force.

Another issue with pole-mounted cables is efficient arrangement of the various cables. This issue is increasingly confronted due to the rapid proliferation of cable-based transport of electrical power and communication signals. Utility poles typically support cables carrying electrical power, telephone signals, and cable television signals. High-capacity fiber optic cables are being installed in many localities, either for replacing existing electrical signal communication lines or to add additional capacity such as high-speed dedicated Internet access.

Cables sag between the supporting poles, and under the influence of wind the cables can sway about and impinge on one another. Such impingement can damage the cables and also potentially creates safety issues, as for example if a power cable electrically contacts a nearby telephone cable. It is known in the art that a staggered arrangement of the cables, i.e. placing the cables at different heights, reduces the likelihood of damaging impingements.

Yet another area of concern with cable support devices is interchangeability. Cable support installation and maintenance is performed in the field. Cable support devices are typically warehoused at one or more central facilities, for example owned by the utility, and maintenance crews select and bring those selected supports deemed necessary for the various repair jobs to be performed on a given day. Selecting the wrong type of support can delay the installation or maintenance and can create or prolong power or communication outages. The problem becomes more acute during emergency situations such as when there is an immediate need during and after severe thunderstorms, when many critical cables may be damaged at essentially the same time. These problems could be mitigated by a modular cable support system comprising a plurality of adaptable multipurpose components from which a plurality of different types of cable support devices are constructable.

The present invention contemplates an improved cable support apparatus, method, and system which overcomes the aforementioned problems and others.

SUMMARY OF THE INVENTION

According to one aspect of the invention, a cable support is disclosed. A clamp base includes a projecting structure on a first side and a receiving structure on an opposite side. The receiving structure is adapted to receive the projecting structure of an identical clamp base. The clamp base further includes a base hinge edge. A clamp keeper has a keeper hinge edge adapted to hingeably attach with the base hinge edge. The clamp keeper and the clamp base together define a cable cavity for receiving an associated cable. The clamp keeper further cooperates with the clamp base to effectuate clamping of the associated cable therebetween.

According to another aspect of the invention, a method is provided for attaching a plurality of cables to a pole. A first support base is connected to the pole. A first cable is supported by the first support base. A second support base is connected to the first support base. A second cable is supported by the second support base.

According to another aspect of the invention, a modular cable support system is provided including a plurality of bases. Each base has an interconnecting structure including a projection and a slot wherein the projection is adapted to insert into the slot of another base for connection therebetween. Each base also has a base hinge edge and a cable channel. A plurality of clamping elements is provided. Each clamping element includes a hinge edge adapted to hingeably attach with the base hinge edge of a selected base, and a clamping surface adapted to cooperate with the cable channel of the selected base for retaining an associated cable.

According to yet another aspect of the invention, a cable clamp is provided including a first clamp portion and a second clamp portion. The first clamp portion has a first hinge region including a first curved projection and a first receiving opening. The first clamp portion also has a first tightening region, and a first cable channel region arranged between the first hinge region and the first tightening region. The second clamp portion has a second hinge region including a second curved projection and a second receiving opening. The second clamp portion also has a second tightening region, and a second cable channel region arranged between the second hinge region and the second tightening region. The first and second hinge regions cooperatively form a hinge. The hinge includes the first curved projection arranged in the second opening and the second curved projection arranged in the first opening. The hinges are formed having a slight material interference to compensate for tolerance or dimensional changes due to the manufacturing process.

According to still yet another aspect of the invention, a cable support system is provided including a plurality of first components. Each first component has an interconnecting structure, a cable channel, and a hinge edge and tightening region disposed on opposite sides of the cable channel. A plurality of second components is also provided. Each second component has a hinge edge, a tightening region disposed on an opposite side from the hinge edge, and a cable channel arranged between the hinge edge and the tightening region. A first cable support device is constructable by hingeably combining selected first and second components via the hinge edges. A second cable support device is constructable by hingeably combining selected two second components via the hinge edges.

One advantage of the present invention resides in its ability to arrange a plurality of cable supports in a staggered-height fashion to allow greater clearance between adjoining cables thereby reducing the likelihood of cable impingement.

Another advantage of the present invention resides in an adaptable hinge which improves clamping force uniformity in the presence of variations in the clamp tightening and/or in the presence of winds or other cable stresses.

Yet another advantage of the present invention resides in its modular nature wherein the various cable support components are modularly combinable to form a plurality of different types of cable support devices.

Numerous additional advantages and benefits of the present invention will become apparent to those of ordinary skill in the art upon reading the following detailed description of the preferred embodiments.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

DETAILED DESCRIPTION OF THE PREFERRED EMBODIMENTS

Figure 1:
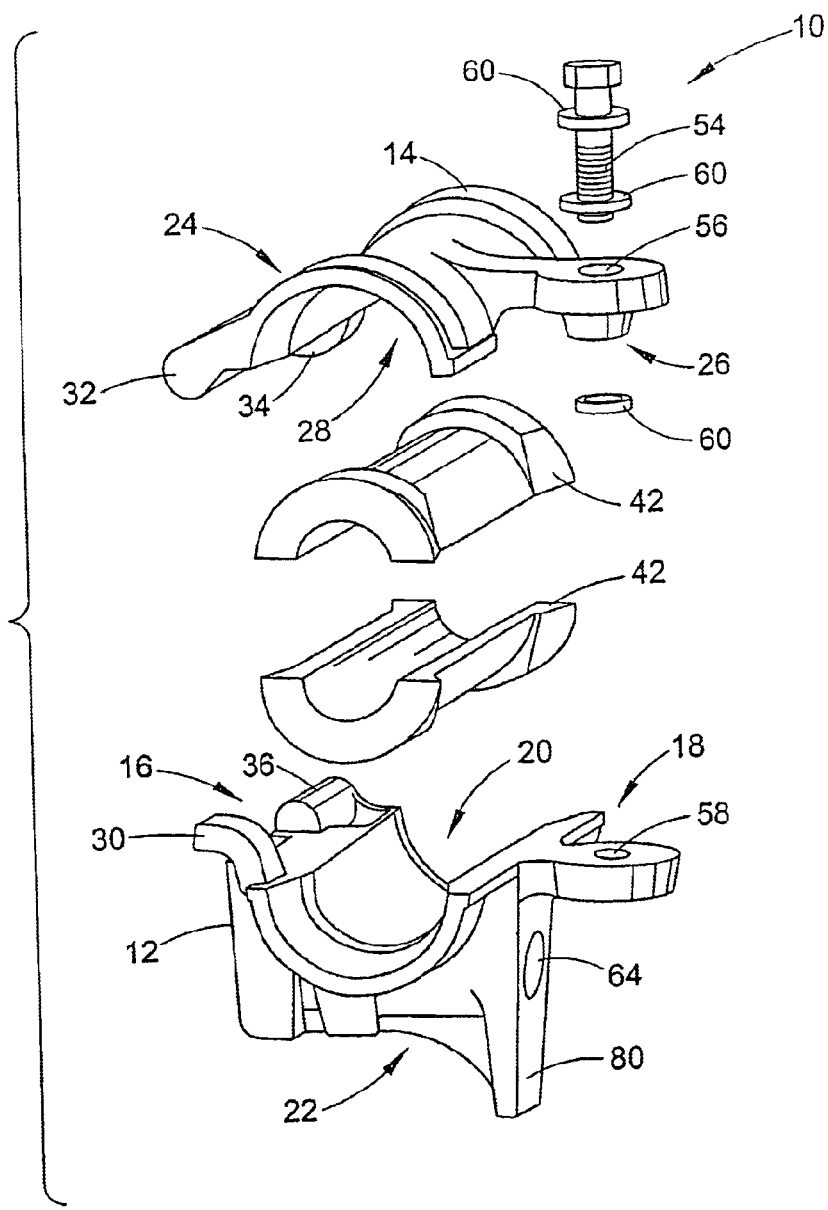
FIG. 1 shows an isometric exploded view of an exemplary cable support according to the preferred embodiment of the invention.
Figure 2:
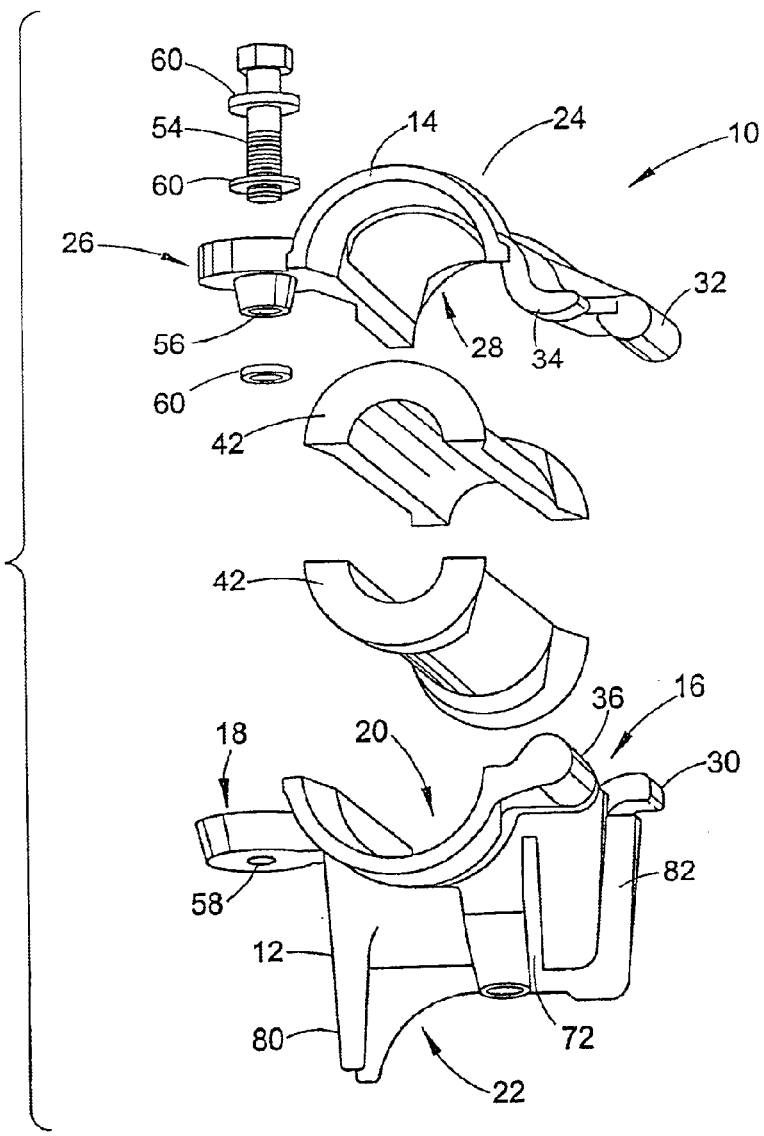
FIG. 2 shows an isometric exploded view of the embodiment of FIG. 1 from an opposite perspective.

With reference to FIGS. 1 and 2, a cable support 10 in accordance with a first preferred embodiment of the invention includes a lower clamp base 12 and upper clamp keeper 14. The clamp base 12 includes a hinge region 16, a tightening region 18, and a cable channel region 20 arranged between the hinge and tightening regions 16, 18. The clamp base 12 also includes an interconnecting structure 22 for adapting the base for connection to a pole or other structure and for adapting a plurality of bases 12 to be interconnected as will be described in greater detail below. The clamp keeper 14 includes a hinge region 24, a tightening region 26, and a cable channel region 28 arranged between the hinge and tightening regions 24, 26.

Figure 3:
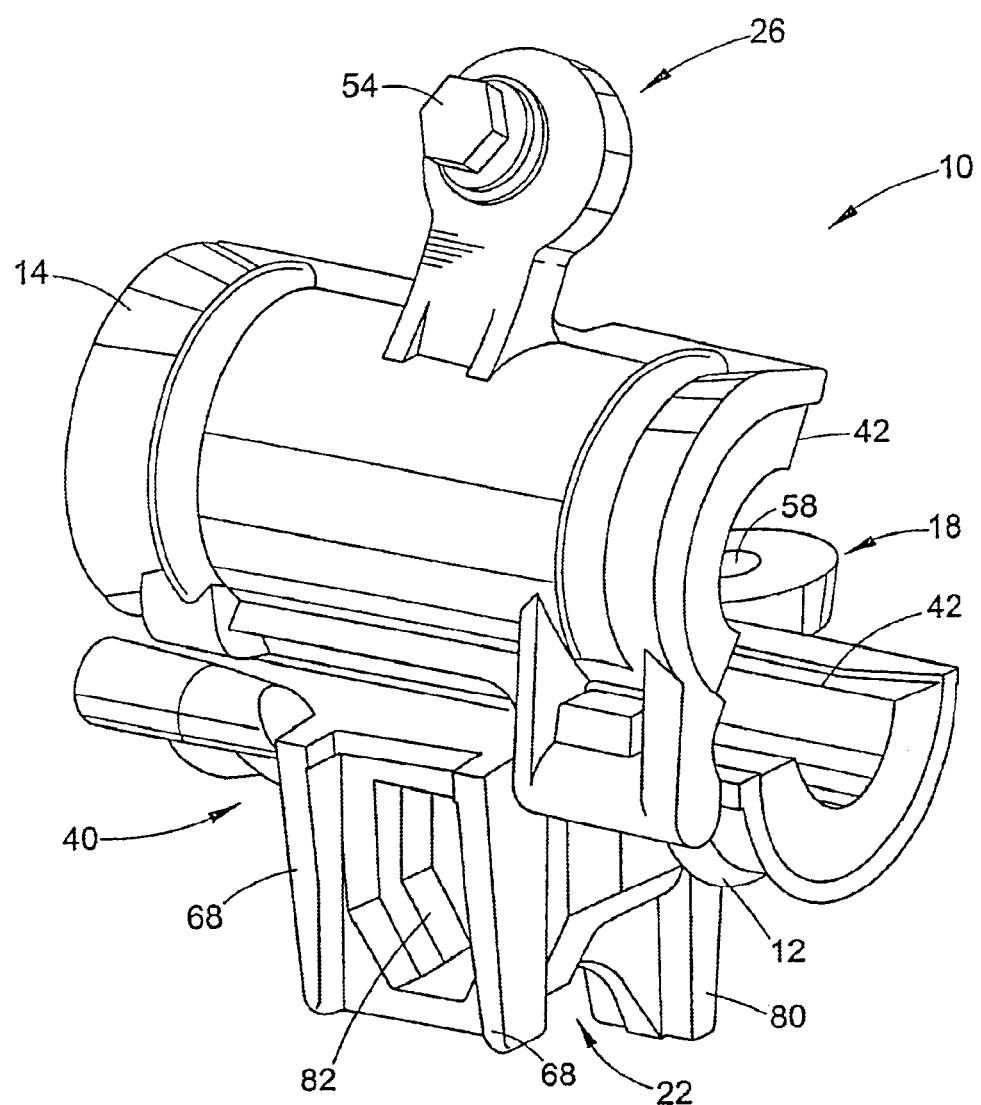
FIG. 3 shows an isometric view of the preferred embodiment of FIG. 1 with the hinge formed.

With continuing reference to FIGS. 1 and 2 and with further reference to FIG. 3, the clamp base 12 and the clamp keeper 14 are adapted to selectively cooperatively hingedly connect via the hinge regions 16, 24. The clamp base hinge region 16 includes a curved tab or projection 30 that mates with an opening or slot 32 of the clamp keeper hinge region 24, and similarly the clamp keeper hinge region 24 includes a curved tab or projection 34 that mates with an opening or slot 36 of the clamp base hinge region 16, to form a hinge 40 shown in FIG. 3. With reference to FIG. 3 the clamp base 12 and the clamp keeper 14 hingedly connect to form a hinged clamp body of the cable support 10. In the preferred embodiment, two cable insert grommets 42 are arranged in the cable channel regions 20, 28 of the cable support 10 to provide a cable cushioning interface.

Figure 4:
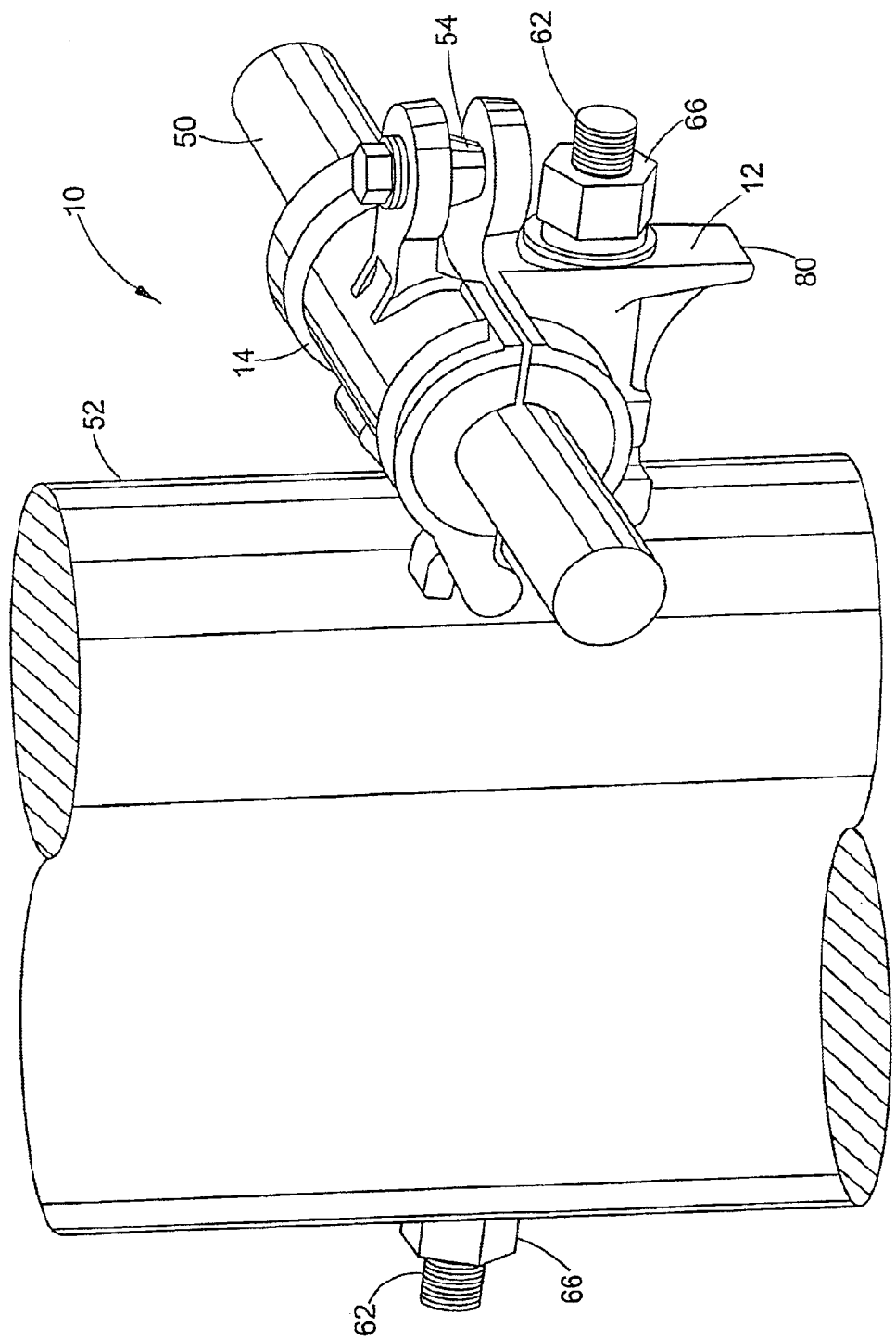
FIG. 4 shows an isometric view of the hinged cable support of FIG. 3 mounted on a pole by a lag bolt.

With continuing reference to FIGS. 1–3 and with further reference to FIG. 4, in typical use, the cable support 10 supports a cable 50 from a utility pole 52. The cable 50 is clamped by a tightening shaft 54, at least a portion of which is threaded (not shown). In the preferred embodiment, the shaft 54 is a bolt that passes through an opening 56 arranged in the tightening region 26 of the clamp keeper 14 and threads into a threaded opening 58 of the tightening region 18 of the base 12. Alternatively, the opening 58 is not threaded and a nut (not shown) or other means are provided to connect with the bolt 54 to effectuate threaded tightening. Other tightening means can also be used. In the illustrated embodiments, washers 60 are included to facilitate the tightening.

The clamp base 12 and the clamp keeper 14, when hingeably interconnected and tightened by tightening means 54 onto the cable 50, define second-class levers that cooperatively act on the cable 50. The fulcrum of the levers is the hinge 40, and the tightening means 54 supplies the applied force which draws the tightening portions 18, 26 together about the hinge 40 to act on the load cable 50 that is interposed between the fulcrum and the applied force.

Those skilled in the art will appreciate that the hinge 40 overcomes significant problems encountered in previous cable supports with regard to hinged clamping action. The curved tabs 30, 34 include concave surfaces that adaptively contact surfaces of the respective slots 32, 36 to maintain even and uniform clamping of the cable 50 over a wide range of drawing forces and cable stresses. Preferably, the cooperative curved tabs 30, 34 and coupling slots 32, 36 are adaptive to maintain uniform clamping over at least selected design tolerance ranges of drawing forces and cable stresses. The hinge 40 is also readily disassembled, thus facilitating modular use of the components 12, 14.

In the application illustrated in FIG. 4, the cable support 10 is itself rigidly connected to the pole 52 using a suitable lag bolt 62 that passes through the pole 52 and an opening 64 (best seen in FIG. 1) in the interconnecting structure 22 of the cable support base 12. The lag bolt 62 is threadedly secured at each end by nuts 66. In the illustrated embodiment, anti-rotation ribs 68 (best seen in FIG. 3) are arranged on the interconnecting structure 22 of the cable support base 12. The ribs 68 define a mounting bracket adapted to contact the pole 52 and bias the base 12 against rotating relative to the pole 52.

Figure 5:
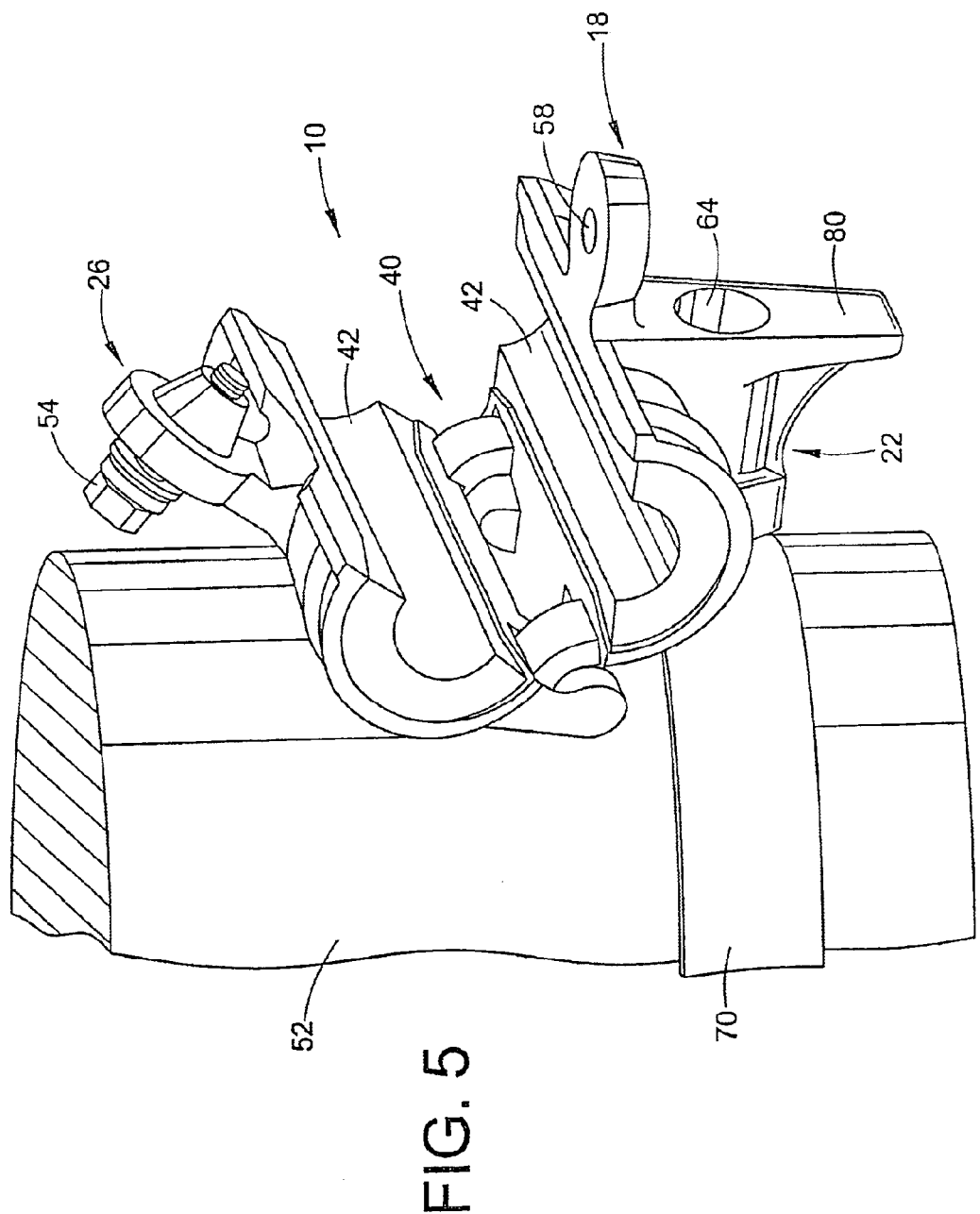
FIG. 5 shows an isometric view of the hinged cable support of FIG. 3 mounted on a pole by a banding strap.

With particular reference to FIG. 5, another method for connecting the cable support 10 to the pole 52 is shown. A banding strap 70 wraps around the pole 52 and also passes through a slot 72 (best seen in FIG. 2) in the interconnecting structure 22 of the base 12 to rigidly fasten the cable support 10 against the pole 52. Again, the anti-rotation ribs 68 define a mounting bracket that prevents rotation of the base 12 relative to the pole 52.

FIG. 5 shows the cable support 10 with the tightening shaft 54 disengaged from the threaded opening 58 and the hinge 40 partially opened. It is to be appreciated, however, that the clamp keeper 14 is nonetheless prevented from disengaging completely at the hinge 40 because the utility pole 52 prevents the hinge from opening wide enough for disengagement of the tabs 30, 34 from coupling slots 32, 36. This arrangement is advantageous because it allows maintenance workers to open the cable support 10 to replace the cable 50 without risk that the cable support 10 will be inadvertently disassembled. Such inadvertent disassembly could result in the clamp keeper 14 falling down, creating inconvenience and a potential safety hazard. It will be additionally appreciated that a similar interaction between the support 10 and the pole 52 also secures the clamp keeper 14 in the arrangement of FIG. 4 which employs the lag bolt 62.

Figure 6:
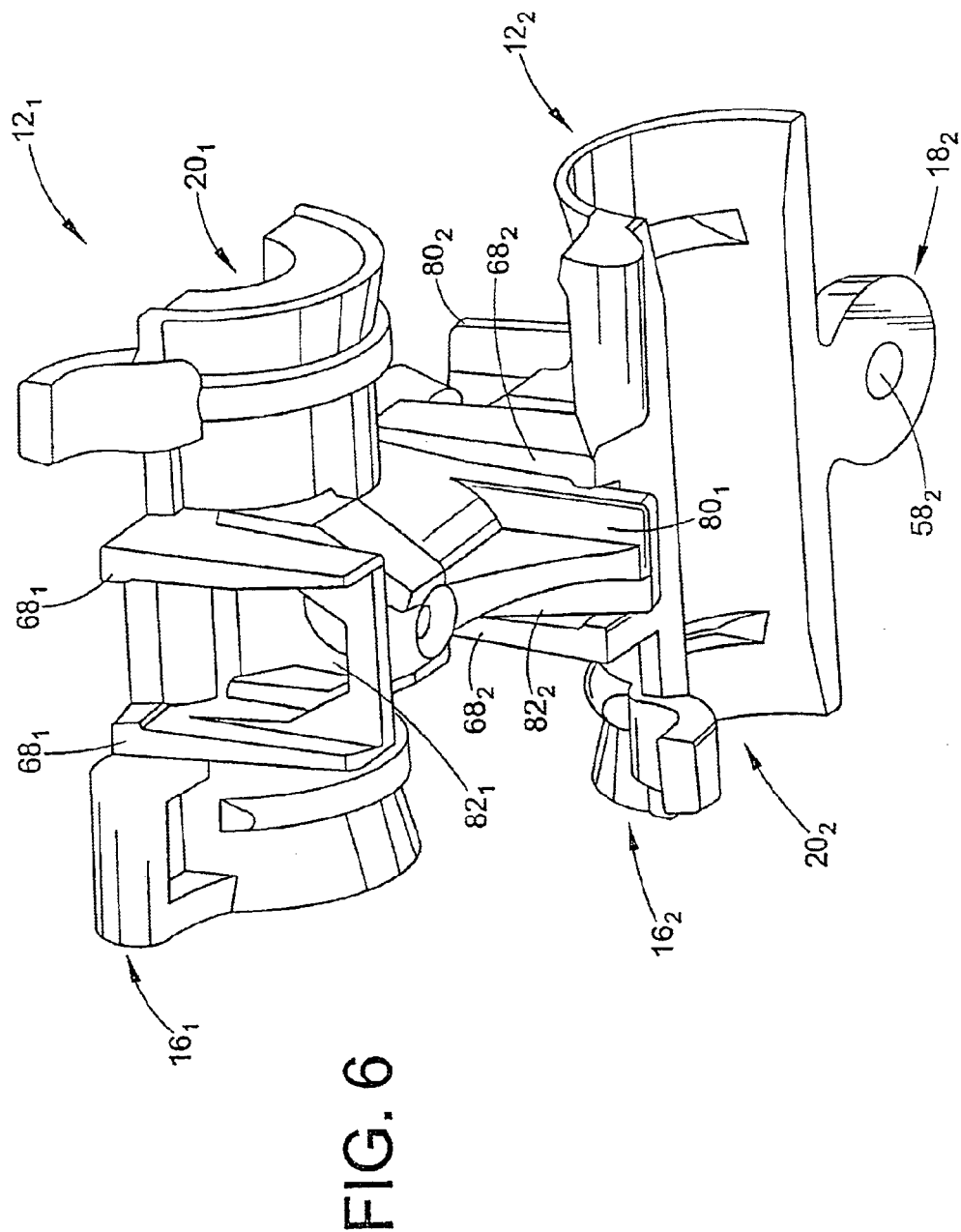
FIG. 6 shows an isometric view two interconnected support bases formed in accordance with another embodiment of the invention.
Figure 7:
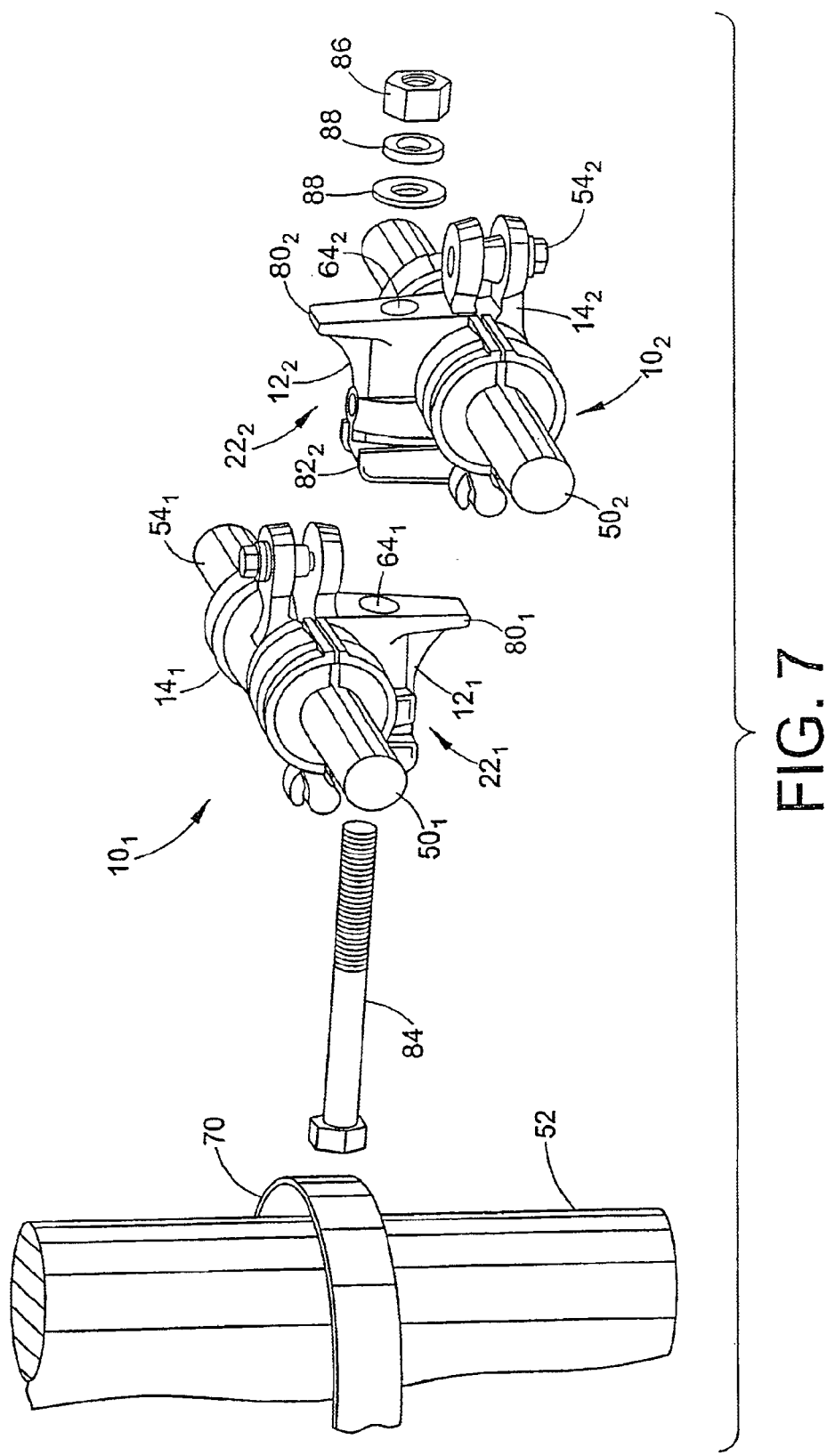
FIG. 7 shows an isometric exploded view of the interconnection of two cable supports formed in accordance with another embodiment of the invention.
Figure 8:
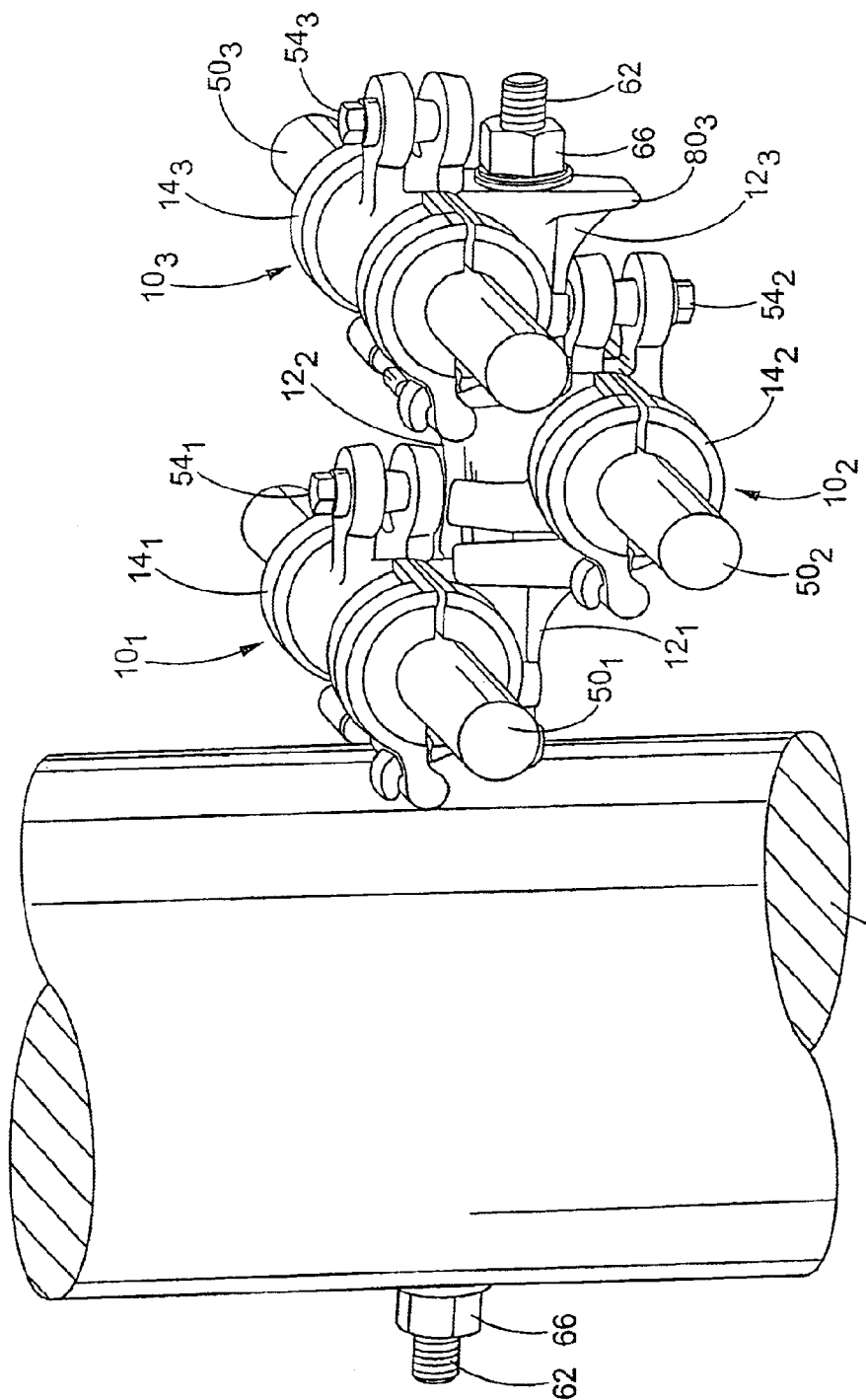
FIG. 8 shows an isometric view of three interconnected cable supports formed in accordance with another embodiment of the invention and mounted on a pole by a lag bolt.

With continuing reference to FIGS. 1–5 and with further reference to FIGS. 6–8, modular interconnecting of a plurality of cable support bases 12 by the interconnecting structures 22 is described. Each interconnecting structure 22 includes a projection or key tang 80 at one end and a receiving recess or slot 82 at an opposite end (best seen in FIGS. 2, 3, and 6) which is defined at least in part by the anti-rotation ribs 68. As best seen in FIG. 6, the tang $80_1$ of a first support base $12_1$ is adapted to insert into the slot $82_2$ of a second support base $12_2$ between the ribs $68_2$. With particular reference to FIGS. 6 and 7, two bases $12_1$, $12_2$ are secured together by a fastening shaft or bolt 84 which passes through openings $64_1$, $64_2$ in the interconnecting structures $22_1$, $22_2$ of the bases $12_1$, $12_2$ and is secured by a nut 86 and optional facilitating washers 88. The interconnected bases are fastened to the pole 52 by the banding strap 70 using the slot $82_1$ and the ribs $68_1$ which were not used in the interconnecting and are available for attaching the interconnected arrangement of the bases $12_1$, $12_2$ to the pole 52 or other fixed structure. This attachment is similar to the banding strap attachment of a single base 12 previously described with reference to FIG. 5.

With continuing reference to FIG. 7, interconnected cable supports $10_1$, $10_2$ further include clamp keepers $14_1$, $14_2$ which are hingeably attached to the interconnected bases $12_1$, $12_2$, respectively in a manner described above. Cables $50_1$, $50_2$ are inserted, and the cable supports $10_1$, $10_2$ are tightened by tightening means $54_1$, $54_2$, respectively.

An advantageous result deriving from the modular interconnected cable supports $10_1$, $10_2$ is that the position of the cables $50_1$, $50_2$ is staggered above and below the level of the fastening shaft 84. Such a staggered arrangement beneficially promotes cable separation and reduces the likelihood of cable impingement during windy conditions.

With reference next to FIG. 8, a modular arrangement of three (3) cable supports $10_1$, $10_2$, $10_3$ for supporting three (3) cables $50_1$, $50_2$, $50_3$ is described. Bases $12_1$, $12_2$, $12_3$ are interconnected via tang-and-slot arrangements as described previously. However, the fastening shaft 84 of FIG. 7 is replaced by the lag bolt 62 which also secures the interconnected bases $12_1$, $12_2$, $12_3$ to the pole 52 in cooperation with the nuts 66 and anti-rotation ribs $68_1$ (not seen in FIG. 8). The securing of the three bases $12_1$, $12_2$, $12_3$ by the lag bolt 62 is similar to the securing of a single base described previously with reference to FIG. 4. In FIG. 8, however, the lag bolt 62 serves the dual purposes of securing the interconnection of the three bases $12_1$, $12_2$, $12_3$ and the securing of these bases to the pole 52. The cable supports $10_1$, $10_2$, $10_3$ also include clamp keepers $14_1$, $14_2$, $14_3$ that are hingeably attached to the corresponding interconnected bases $12_1$, $12_2$, $12_3$, and appropriate tightening hardware $54_1$, $54_2$, $54_3$ for securing cables $50_1$, $50_2$, $50_3$ in the supports $10_1$, $10_2$, $10_3$, respectively.

With continuing further reference to FIG. 8, it is to be appreciated that the unused tang $80_3$ can optionally be used to secure a fourth base (not shown), and that furthermore an arbitrary number of bases can be stacked in like fashion, limited only by the structural stability of the interconnected bases. In one suitable embodiment for supporting fiber optic cables, the bases 12 and the clamp keepers 14 are made from light-weight sturdy materials suitable for supporting a plurality of cables using arrangements similar to those illustrated in FIGS. 7 and 8. The preferred materials include cast aluminum and aluminum alloys.

FIG. 8 also clearly shows the staggered arrangement of the cables $50_1$, $50_2$, $50_3$ supported by the subject modular clamp. As can be seen, the cables are alternatively positioned above, below, and above the lag bolt 62, respectively. It is also apparent that the first cable support $10_1$ could instead be connected to the pole 52 in an upside-down orientation relative to that shown in FIG. 8, so that cable $50_1$ would be arranged below the lag bolt 62, in which case the cables $50_2$, $50_3$ would alternate above and below the lag bolt 62, respectively.

With reference once again overall to FIGS. 1–8, a modular cable support 10 has been described, which provides for mounting one or a plurality of cables from a pole or other fixed structure using a lag bolt 62 or a banding strap 70. Of course, the interconnecting structure 22 is readily adaptable to accommodate other mechanisms for fastening the base 12 to the pole 52 or other structure. The tang-and-slot arrangement of the interconnecting structure 22 also permits modular interconnection of two or more bases horizontally in a staggered manner. This is particularly advantageous since in many localities the various users of cable support poles, such as telephone, electrical power, and cable television companies, are allocated selected height ranges for their cables. The horizontal interconnection thus allows several cables to be connected at essentially the same height offset only slightly by the staggering distance.

Figure 9:
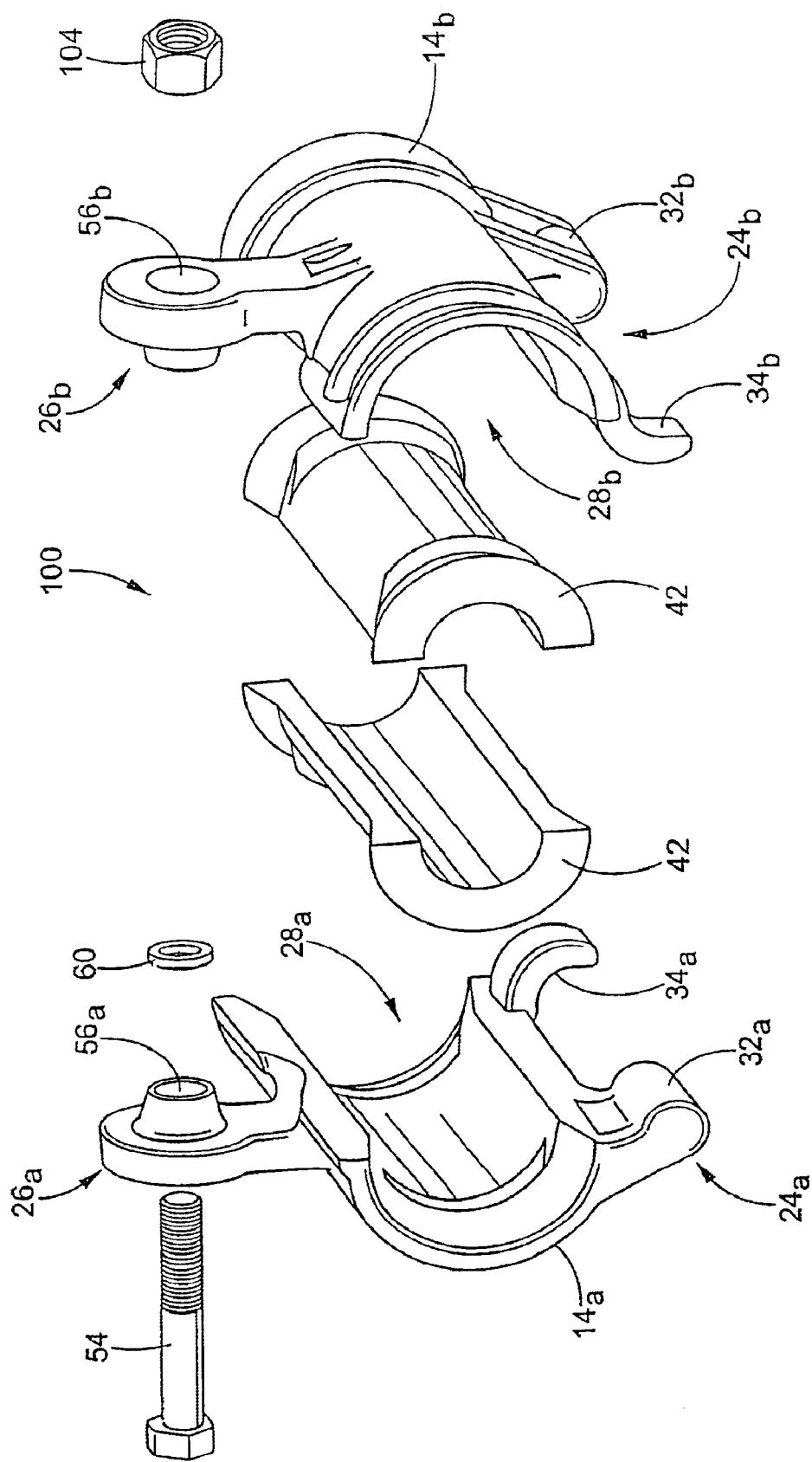
FIG. 9 shows an isometric exploded view of a cable support for cable suspension from an overhead structure, constructed in modular fashion using components formed in accordance with another embodiment of the invention.
Figure 10:
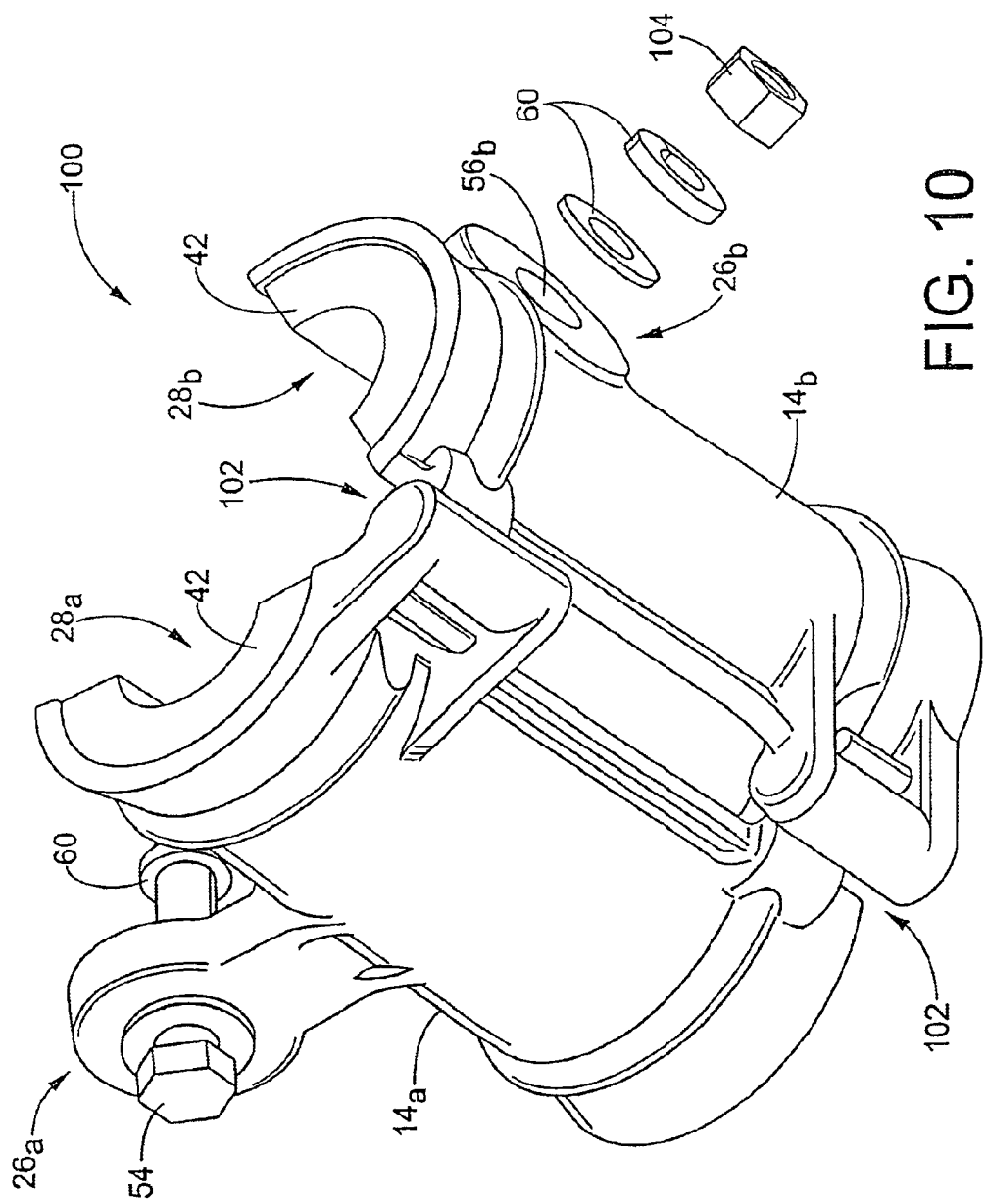
FIG. 10 shows an isometric view of the suspension cable support of FIG. 9 with the hinge formed.
Figure 11:
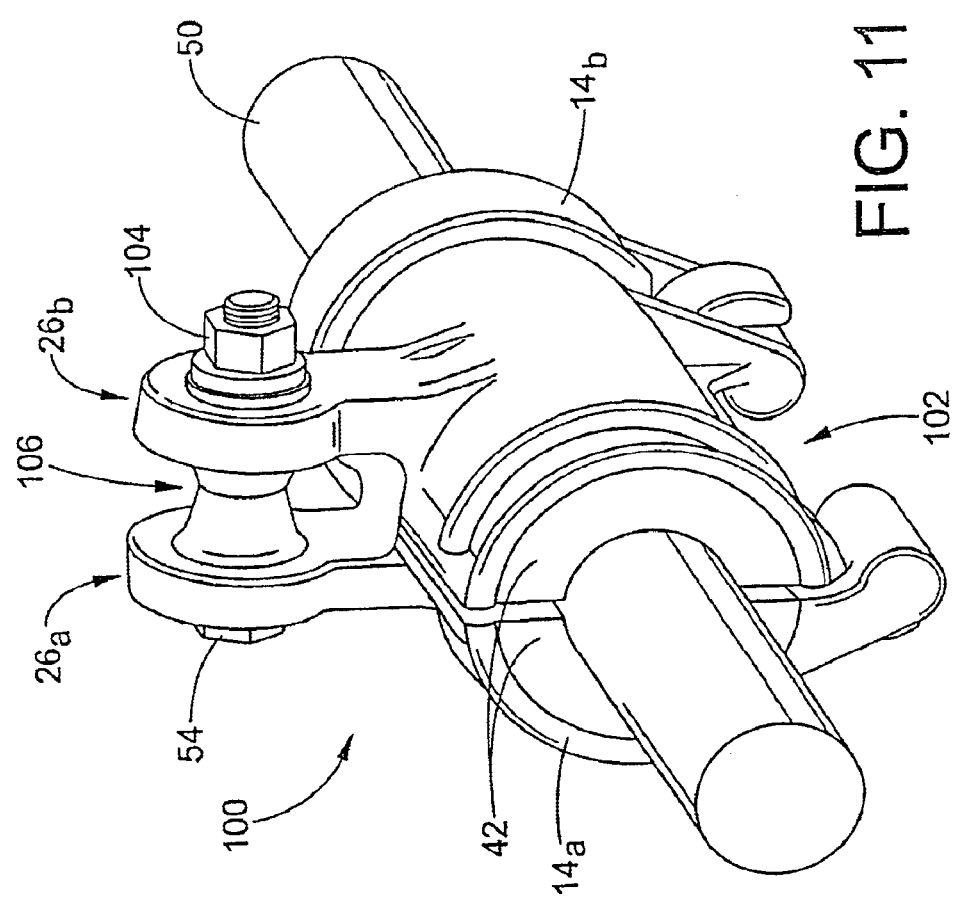
FIG. 11 shows an isometric view of the suspension cable support of FIG. 9 supporting a cable.

With reference next to FIGS. 9–11, another aspect of the subject modular cable support system is described, wherein a suspension clamp 100 is provided by combining two cable keepers $14_a$, $14_b$. The suspension clamp 100 is suitable for suspending a cable from an associated overhead structure, such from as an overhead support wire, an overhead high-tension power line tower, or the like. As seen in exploded view of FIG. 9, in addition to utilizing the clamp keepers $14_a$, $14_b$, the suspension clamp 100 further utilizes two (2) of the cable insert grommets 42, the tightening bolt 54, and a self-locking nut 104, which components are also used in the cable support 10 of FIGS. 1–8. Thus, these components are modular and are selectively assembled as desired to make a cable support 10 of the type shown in FIGS. 1–8, or can be assembled to make the suspension clamp 100 of FIGS. 9–11.

With continuing reference to FIGS. 9–11, the curved projection $34_a$ of the clamp keeper $14_a$ selectively mates with the opening or slot $32_b$ of the clamp keeper $14_b$ and similarly the curved projection $34_b$ of the clamp keeper $14_b$ selectively mates with the opening or slot $32_a$ of the clamp keeper $14_a$ to thereby cooperatively form a hinge 102. The hinge 102 connects the clamp keepers $14_a$, $14_b$ and has the same advantageous adaptive properties as the hinge 40 of the cable support 10. The curved tabs $34_a$, $34_b$ include concave surfaces that adaptively contact surfaces of the respective slots $32_b$, $32_a$ to maintain an even and uniform clamping force over a wide range of drawing forces and cable stresses.

In the illustrated cable support device 10 of FIGS. 1–8, the bolt 54 threads into the threaded opening 58 of the tightening region 18 of the cable support base 12 to effectuate threaded tightening. In such an arrangement, the opening 56 in the tightening region 26 of the clamp keeper 14 is advantageously an unthreaded hole passing through the tightening region 26 which is large enough to allow the bolt 54 to rotate freely therein. Hence, in constructing the suspension clamp 100, a "pin-loc" type hexnut 104 threads onto the bolt 54 to provide the threaded tightening mechanism. The preferred hexnut includes an integral locking pin which ensures a constant locking torque while enabling the nut to ratchet onto the bolt 54. Hexnuts of this type are available from ANCO.

The operation of the clamp 100 is similar to that of cable securing mechanism of the cable support system 10. The two hingeably interconnected clamp keepers $14_a$, $14_b$ are tightened by cooperation of the bolt 54 and the nut 104 onto the cable 50. The two clamp keepers $14_a$, $14_b$ define second-class levers that cooperatively act on the cable 50. The fulcrum of the levers is the hinge 102, and the tightening means 54, 104 supplies the applied force which draws the tightening portions $26_a$, $26_b$ together about the hinge 102 to act on the load cable 50 which is interposed between the fulcrum and the applied force.

The suspension clamp 100 further includes a connection region 106 (FIG. 11) comprising a half-loop cooperatively defined by the tightening regions $26_a$, $26_b$ and the bolt-and-nut fastener 54, 104. An associated suspension loop or other associated connecting element (not shown) connects with the connection region 106 for suspending the suspension clamp 100 from an overhead structure.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A cable support comprising:
   a first clamp base including a projecting structure on a first side and a receiving structure on an opposite side, the receiving structure adapted to receive the projecting structure of an identical associated second clamp base, the first clamp base further including a base hinge edge including a base curved tab and a base slot; and
   a first clamp keeper having a keeper hinge edge adapted to hingeably attach with the base hinge edge, the first clamp keeper and the first clamp base together defining a cable cavity for receiving an associated cable, the first clamp keeper further cooperating with the first clamp base to selectively clamp the associated cable therebetween, the keeper hinge edge including a keeper curved tab and a keeper slot adapted to cooperate with the base slot and the base tab, respectively, of the base hinge edge with a mechanical interference fit to maintain a uniform clamping force on the associated cable over a range of drawing forces between the base and keeper.

2. The cable support as set forth in claim 1, wherein the first clamp base further includes:
   a fastener opening passing through the projecting structure and the receiving structure.

3. The cable support as set forth in claim 2, further including:
   a second clamp base having at least one of a projecting structure and a receiving structure that is substantially identical to the corresponding structure of the first clamp base and further having a second fastener opening; and
   a fastener arrangeable in the fastener opening and the second fastener opening, the fastener adapted to cooperate with the first and second clamp bases to connect first and second clamp bases.

4. The cable support as set forth in claim 2, further including:
   a second clamp base substantially identical with the first clamp base and including a second projecting structure and a second receiving structure, the second clamp base defining a second fastener opening extending between the second projecting structure and the second receiving structure; and
   a fastener arrangeable in the fastener openings of the first clamp base and the second clamp base for connecting the first and second clamp bases.

5. The cable support as set forth in claim 4, further including:
   a third clamp base substantially identical with the first clamp base and including a third projecting structure and a third receiving structure, the third clamp base defining a third fastener opening extending between the third projecting structure and the third receiving structure; and
   a fastener arrangeable in the fastener openings of the first clamp base, the second clamp base, and the third clamp base for rigidly connecting the clamp bases.

6. The cable support as set forth in claim 2, including:
   a second clamp base substantially identical with the first clamp bases and defining a second fastener opening passing through the second clamp base; and
   a fastener selectively received in the fastener openings of the first and second clamp bases for connecting the first and second clamp bases.

7. The cable support as set forth in claim 1, further including:
   a second clamp keeper arranged to hingeably attach to the first clamp keeper and cooperating therewith to form an overhead suspension clamp.

8. The cable support as set forth in claim 1, wherein:

the keeper curved tab and the keeper slot of the keeper hinge edge are adapted to cooperate with a second curved tab and a second slot of a second substantially identical clamp keeper to hingeably attach therewith, the first and second clamp keepers cooperatively defining a cable cavity for clamping an associated cable therebetween.

9. A cable support comprising:

a first clamp base including a projecting structure on a first side, a receiving structure on an opposite side, and a fastener opening passing through the projecting structure and the receiving structure, the receiving structure being adapted to receive the projecting structure of an identical associated second clamp base, the first clamp base further including a base hinge edge; and a first clamp keeper having a keeper hinge edge adapted to hingeably attach with the base hinge edge, the first clamp keeper and the first clamp base together defining a cable cavity for receiving an associated cable, the first clamp keeper further cooperating with the first clamp base to selectively clamp the associated cable therebetween.

10. The cable support as set forth in claim 9, further including:

a second clamp base having at least one of a projecting structure and a receiving structure that is substantially identical to the corresponding structure of the first clamp base and further having a second fastener opening; and a fastener arrangeable in the fastener opening and the second fastener opening, the fastener adapted to cooperate with the first and second clamp bases to connect first and second clamp bases.

11. The cable support as set forth in claim 9, further including:

a second clamp base substantially identical with the first clamp base and including a second projecting structure and a second receiving structure, the second clamp base defining a second fastener opening extending between the second projecting structure and the second receiving structure; and a fastener arrangeable in the fastener openings of the first clamp base and the second clamp base for connecting the first and second clamp bases.

12. The cable support as set forth in claim 11, further including:

a third clamp base substantially identical with the first clamp base and including a third projecting structure and a third receiving structure, the third clamp base defining a third fastener opening extending between the third projecting structure and the third receiving structure; and a fastener arrangeable in the fastener openings of the first clamp base, the second clamp base, and the third clamp base for rigidly connecting the clamp bases.

13. The cable support as set forth in claim 9, further including:

a second clamp base substantially identical with the first clamp bases and defining a second fastener opening passing through the second clamp base; and a fastener selectively received in the fastener openings of the first and second clamp bases for connecting the first and second clamp bases.

14. A cable support system comprising:

a first clamp base including a projecting structure on a first side and a receiving structure on an opposite side, the receiving structure being adapted to receive the projecting structure of an identical associated second clamp base, the first clamp base further including a base hinge edge;

a first clamp keeper having a keeper hinge edge adapted to hingeably attach with the base hinge edge, the first clamp keeper and the first clamp base together defining a cable cavity for receiving an associated cable, the first clamp keeper further cooperating with the first clamp base to selectively clamp the associated cable therebetween; and a second clamp keeper arranged to hingeably attach to the first clamp keeper and cooperate therewith to form an overhead suspension clamp.

15. A cable comprising:

a first clamp base including a projecting structure on a first side and a receiving structure on an opposite side, the receiving structure being adapted to receive the projecting structure of an identical associated second clamp base, the first clamp base further including a base hinge edge having a curved tab and a slot; and a first clamp keeper having a keeper hinge edge adapted to hingeably attach with the base hinge edge, the first clamp keeper and the first clamp base together defining a cable cavity for receiving an associated cable, the first clamp keeper further cooperating with the first clamp base to selectively clamp the associated cable therebetween, the keeper hinge edge including a curved tab and a slot adapted to cooperate with the slot and the curved tab, respectively, of the base hinge edge to form a hinge.

16. A cable support comprising:

a first clamp base including a projecting structure on a first side and a receiving structure on an opposite side, the receiving structure being adapted to receive the projecting structure of an identical associated second clamp base, the first clamp base further including a base hinge edge having a curved tab and a slot; and, a first clamp keeper having a keeper hinge edge adapted to hingeably attach with the base hinge edge, the first clamp keeper and the first clamp base together defining a cable cavity for receiving an associated cable, the first clamp keeper further cooperating with the first clamp base to selectively clamp the associated cable therebetween, the keeper hinge edge including a curved tab and a slot adapted to cooperate with the slot and curved tab, respectively, of the base hinge edge to form a hinge, wherein the curved tab and slot of the keeper hinge edge are adapted to cooperate with the curved tab and slot of a second substantially identical clamp keeper to hingeably attach therewith, the first and second clamp keepers cooperatively defining a cable cavity for clamping an associated cable therebetween.

17. A method for attaching a plurality of cables to a pole, the method comprising:

providing a cable support including: a first clamp base having a projecting structure on a first side, a receiving structure on an opposite side, and a fastener opening passing through the projecting structure and the receiving structure, the receiving structure being adapted to receive the projecting structure of an identical associated second clamp base, the first clamp base further including a base hinge edge; and a first clamp keeper having a keeper hinge edge adapted to hingeably attach with the base hinge edge, the first clamp keeper and the first clamp base together defining a cable cavity for receiving an associated cable, the first clamp keeper further cooperating with the first clamp base to selectively clamp the associated cable therebetween;

connecting the first support base to the pole;

supporting a first cable by the first support base;

connecting a second support base to the first support base; and supporting a second cable by the second support base.

18. The method as set forth in claim 17, wherein the supporting of the first cable includes supporting the first cable above the first support base relative to earth ground and the supporting of the second cable includes supporting the second cable below the second support base relative to earth ground.

19. The method as set forth in claim 17, wherein the supporting of the first cable includes supporting the first cable below the first support base relative to earth ground and the supporting of the second cable includes supporting the second cable above the second support base relative to earth ground.

20. The method as set forth in claim 17, further including:
repeating the connecting and supporting steps to support at least a third cable by a third support base.

21. A modular cable support system comprising:
a plurality of bases each having a base body defining:
an interconnecting structure including a projection and a slot wherein the projection is adapted to insert into the slot of another base for connection therebetween,
a base hinge edge, and
a cable channel;
a plurality of clamping elements each having a clamping element body defining:
a clamping element hinge edge adapted to hingeably attach with the base hinge edge of a selected base with a mechanical interference fit to maintain a uniform clamping force on an associated cable over a range of drawing forces between the base and the clamping element, and
a clamping surface adapted to cooperate with the cable channel of the selected base for retaining the associated cable, and;
a plurality of fasteners, each fastener adapted to cooperate with the selected base and a selected clamping element to draw the selected base and the selected clamping element together about the base hinge edge of the selected base and the clamping element hinge edge of the selected clamping element.

22. The modular cable support system as set forth in claim 21, wherein the bases and the clamping elements are formed of an aluminum material.

23. The modular cable support system as set forth in claim 21, wherein the hinge edges of the clamping elements are further adapted to form a hinged attachment of two clamping elements, said clamping elements cooperating with a fastener to clamp the associated cable between the clamping surfaces of the two clamping elements.

24. The modular cable support system as set forth in claim 21, further including:
a plurality of cable insert grommets adapted to cooperate with at least one of the cable channel and the clamping surface for reducing stress on an associated clamped cable selectively disposed in said cable channel.

25. The modular cable support system as set forth in claim 21, wherein each base further includes:
a slot adapted for supporting the base on an associated pole by an associated banding strap.

26. The modular cable support system as set forth in claim 21, wherein the interconnecting structure of each base defines an connector opening passing therethrough.

27. The modular cable support system as set forth in claim 26, further including:
at least one securing shaft adapted to extend into the connector opening of at least two bases for selectively connecting the bases together.

28. The modular cable support system as set forth in claim 27, wherein the at least two bases are arranged with the respective cable channels thereof alternatingly disposed on opposite sides of said at least one shaft for successive bases.

29. A modular cable support system comprising:
a plurality of base bodies each having:
an interconnecting structure including a projection and a slot wherein the projection is adapted to insert into the slot of another base for connection therebetween,
a base hinge edge, and
a cable channel;
a plurality of clamping element bodies each having:
a clamping element hinge edge adapted to hingably attach with the base hinge edge of a selected base body, and
a clamping surface adapted to cooperate with the cable channel of the selected base body for retaining an associated cable; and,
a plurality of fasteners, each fastener adapted to cooperate with the selected base body and a selected clamping element body to draw the selected base body and the selected clamping element body together about the base hinge edge of the selected base body and the clamping element hinge edge of the selected clamping element body.

30. A modular cable support system comprising:
a plurality of bases each defining:
an interconnecting structure including a projection and a slot wherein the projection is adapted to insert into the slot of another base for connection therebetween,
a base hinge edge, and
a cable channel; and
a plurality of clamping elements each defining:
a clamping element hinge edge adapted to hingably attach with the base hinge edge of a selected base, and
a clamping surface adapted to cooperate with the cable channel of the selected base for retaining an associated cable, wherein the hinge edges of the clamping elements are further adapted to form a hinged attachment of two clamping elements, said clamping elements cooperating with a fastener to clamp the associated cable between the clamping surfaces of the two clamping elements.

31. A modular cable support system comprising:
a plurality of bases each having:
a base body defining: i) an interconnecting structure including a projection and a slot wherein the projection is adapted to insert into the slot of another base for connection therebetween, ii) a base hinge edge, and iii) a cable channel;
a plurality of clamping elements each having:
a clamping element defining: i) a clamping element hinge edge adapted to hingeably attach with the base hinge edge of a selected base, and ii) a clamping surface adapted to cooperate with the cable channel of the selected base for retaining an associated cable; and, a plurality of cable insert grommets adapted to cooperate with at least one of the cable channel and the clamping surface for reducing stress on an associated clamped cable selectively disposed in said cable channel.

32. A modular cable support system comprising:

a plurality of bases each forming:
an interconnecting structure including a projection and a slot wherein the projection is adapted to insert into the slot of another base for connection therebetween;
a base hinge edge,
a cable channel; and,
a slot adapted for supporting the base on an associated pole by an associated banding strap; and, a plurality of clamping elements each forming:
a clamping element hinge edge adapted to hingably attach with the base hinge edge of a selected base, and
a clamping surface adapted to cooperate with the cable channel of the selected base for retaining an associated cable.

33. A modular cable support system comprising:

a plurality of bases each having:
an interconnecting structure including a projection and a slot wherein the projection is adapted to insert into the slot of another base for connection therebetween,
a base hinge edge coupled with the interconnecting structure, and
a cable channel coupled with the interconnecting structure and with the base hinge edge; and a plurality of clamping elements each having:
a clamping element hinge edge adapted to hingeably attach with the base hinge edge of a selected base, and
a clamping surface coupled with the clamping element hinge edge, the clamping surface being adapted to cooperate with the cable channel of the selected base for retaining an associated cable, wherein the interconnecting structure of each base defines a connector opening passing therethrough.

34. The modular cable support system as set forth in claim 33, further including:
at least one securing shaft adapted to extend into the connector opening of at least two bases for selectively connecting the bases together.

35. The modular cable support system as set forth in claim 34, wherein the at least two bases are arranged with the respective cable channels thereof alternatingly disposed on opposite sides of said at least one shaft for successive bases.

36. A cable clamp comprising:

a first clamp portion having:
a first hinge region including a first curved projection and a first receiving opening,
a first tightening region, and
a first cable channel region arranged between the first hinge region and the first tightening region; and a second clamp portion having:
a second hinge region including a second curved projection and a second receiving opening,
a second tightening region, and
a second cable channel region arranged between the second hinge region and the second tightening region; and, a fastener operatively coupled with said first tightening region and said second tightening region, and adapted to selectively draw said first and second tightening regions together;

wherein the first and second hinge regions cooperatively form a hinge including the first curved projection arranged in the second opening and the second curved projection arranged in the first opening, and wherein said fastener and said first and second tightening regions collectively form a connection region of said cable clamp for suspending the cable clamp from overhead by an associated connecting element.

37. The cable clamp as set forth in claim 36, wherein:
said fastener includes threaded means for hingedly drawing the first and second tightening regions together to clamp an associated cable between the first and second cable channel regions.

38. The cable clamp as set forth in claim 36, wherein the first and second curved projections each include concave surfaces that adaptively contact surfaces of the second and first openings, respectively, to maintain uniform hinging over a range of drawing forces applied by the fastener and over a range of cable stresses within selected design tolerance ranges.

39. The cable clamp as set forth in claim 36, wherein the first and second clamp portions define second-class levers cooperatively acting on the associated cable responsive to a force applied by the drawing means.

40. The cable clamp as set forth in claim 36, wherein the first and second tightening regions include:
first and second ear members, each ear member including an opening adapted to receive the fastener.

41. The cable clamp as set forth in claim 36, wherein the first clamp portion further includes:
an interconnecting structure adapted for rigid connection with an associated third clamp portion of an associated second clamp wherein the associated third clamp portion is substantially identical with the first clamp portion.

42. The cable clamp as set forth in claim 41, wherein the interconnecting structure includes a recess and a mating protrusion.

43. The cable clamp as set forth in claim 41, wherein the interconnecting structure is adapted to effectuate stacking of three or more clamp portions each essentially identical with the first clamp portion.

44. The cable clamp as set forth in claim 36 wherein said first and second projections and the first and second openings form an interference fit to compensate for directional changes in the first and second clamp portions.

45. A cable clamp comprising:

a first clamp portion having:
a first hinge region including a first curved projection and a first receiving opening, a first tightening region,
a first cable channel region arranged between the first hinge region and the first tightening region, and
an interconnecting structure adapted for rigid connection with an associated second cable clamp; and a second clamp portion having:
a second hinge region including a second curved projection and a second receiving opening,
a second tightening region, and
a second cable channel region arranged between the second hinge region and the second tightening region, wherein the first and second hinge regions cooperatively form a hinge including the first curved projection arranged in the second opening and the second curved projection arranged in the first opening.

46. The cable clamp as set forth in claim 45, further including:
   means for hingedly drawing the first and second tightening regions together to clamp an associated cable between the first and second cable channel regions.

47. The cable clamp as set forth in claim 46, wherein the first and second curved projections each include concave surfaces that adaptively contact surfaces of the second and first openings, respectively, to maintain uniform hinging over a range of drawing forces applied by the tightening means and over a range of cable stresses within selected design tolerance ranges.

48. The cable clamp as set forth in claim 46, wherein the first and second clamp portions define second-class levers cooperatively acting on the associated cable responsive to a force applied by the drawing means.

49. The cable clamp as set forth in claim 45, further including:
   a tightening shaft having a threaded region arranged on at least a portion thereof and adapted to hingedly draw the first and second tightening regions together to form a hinged clamping of an associated cable arranged between the first and second cable channel regions.

50. The cable clamp as set forth in claim 49, wherein the first and second tightening regions include:
   first and second ear members, each ear member including an opening adapted to receive the tightening shaft.

51. A cable clamp comprising:
   a first clamp portion having:
      a first hinge region including a first curved projection and a first receiving opening,
      a first tightening region, and
      a first cable channel region arranged between the first hinge region and the first tightening region, wherein the first clamp portion further includes an interconnecting structure adapted for rigid connection with an associated third clamp portion of an associated second clamp wherein the associated third clamp portion is substantially identical with the first clamp portion; and,
   a second clamp portion having:
      a second hinge region including a second curved projection and a second receiving opening,
      a second tightening region, and
      a second cable channel region arranged between the second hinge region and the second tightening region, wherein the first and second hinge regions cooperatively form a hinge including the first curved projection arranged in the second opening and the second curved projection arranged in the first opening.

52. The cable clamp as set forth in claim 51, wherein the interconnecting structure includes a recess and a mating protrusion.

53. The cable clamp as set forth in claim 51, wherein the interconnecting structure is adapted to effectuate stacking of three or more clamp portions each essentially identical with the first clamp portion.

54. A cable support system comprising:
   a plurality of first components each having a hinge edge, a tightening region disposed on an opposite side from the hinge edge, a cable receiving channel arranged between the hinge edge and the tightening region, and an interconnecting structure; and
   a plurality of second components each having a hinge edge, a tightening region disposed on an opposite side from the hinge edge, and a cable receiving channel arranged between the hinge edge and the tightening region;
   wherein a first cable support device is constructable by hingeably combining a first set of selected first and second components at the hinge edges and developing a material interference at the hinge edges to compensate for size variations caused during manufacture, and
   wherein a second cable support device is constructable by hingeably combining a second set of selected two second components via the hinge edges.

55. The cable support system as set forth in claim 54, wherein the first and second cable support devices are each adapted to clamp an associated cable between the cable channels responsive to a drawing of the tightening regions together about a hinge defined by the hinge edges.

56. The cable support system as set forth in claim 54, wherein the first cable support device is adapted to connect an associated cable to an associated pole or other essentially vertical structure via the interconnecting structure.

57. The cable support system as set forth in claim 54, wherein the second cable support device comprises a suspension clamp for suspending an associated cable from an associated overhead support.

58. The cable support system as set forth in claim 57, wherein the second cable support device includes a shaft connecting the tightening regions of the two second components, said shaft cooperating with the tightening regions to define a connection region for the suspending.

59. The cable support system as set forth in claim 54, wherein the interconnecting structure includes a bracket for mounting the first cable support device to a pole.

60. A cable support system comprising:
   a plurality of first components each having a hinge edge, a tightening region disposed on an opposite side from the hinge edge, a cable receiving channel arranged between the hinge edge and the tightening region, and an interconnecting structure;
   a plurality of second components each having a hinge edge, a tightening region disposed on an opposite side from the hinge edge, and a cable receiving channel arranged between the hinge edge and the tightening region;
   wherein a first cable support device is constructable by hingeably combining a first set of selected first and second components via the hinge edges;
   wherein a second cable support device is constructable by hingeably combining a second set of selected two second components via the hinge edges;
   wherein the first cable support device is adapted to connect an associated cable to an associated structure via the interconnecting structure; and
   wherein a third cable support device is constructable by hingeably combining a third set of selected first and second components, and wherein the third cable support device is arrangeable to connect an associated second cable to the first cable support device via cooperation of the interconnecting structures of the first and third cable support devices.

61. A cable support system comprising:
   a plurality of first components each having a hinge edge, a tightening region disposed on an opposite side from the hinge edge, a cable receiving channel arranged between the hinge edge and the tightening region, and an interconnecting structure;

a plurality of second components each having a hinge edge, a tightening region disposed on an opposite side from the hinge edge, and a cable receiving channel arranged between the hinge edge and the tightening region;

wherein a first cable support device is constructable by hingeably combining a first set of selected first and second components via the hinge edges;

wherein a second cable support device is constructable by hingeably combining a second set of selected two second components via the hinge edges;

wherein the interconnecting structure includes a bracket for mounting the first cable support device to a pole; and wherein the interconnecting structure further includes a projection and a slot wherein two first cable support devices are selectively interconnectable by inserting the projection of the one first cable support device into the slot of the other first cable support device.

62. A cable clamp comprising:

a first clamp portion having:
   a first hinge region including a first curved projection and a first receiving opening,
   a first tightening region,
   a first cable channel region arranged between the first hinge region and the first tightening region, and
   an interconnecting structure adapted for rigid connection with an associated third clamp portion of an associated second clamp wherein the associated third clamp portion is substantially identical with the first clamp portion; and, a second clamp portion having:
   a second hinge region including a second curved projection and a second receiving opening,
   a second tightening region, and
   a second cable channel region arranged between the second hinge region and the second tightening region;

wherein the first and second hinge regions cooperatively form a hinge including the first curved projection arranged in the second opening and the second curved projection arranged in the first opening.

63. The cable clamp as set forth in claim 62, wherein the interconnecting structure includes a recess and a mating protrusion.

64. The cable clamp as set forth in claim 62, wherein the interconnecting structure is adapted to effectuate stacking of three or more clamp portions each essentially identical with the first clamp portion.

65. The cable clamp as set forth in claim 62 wherein said first and second projections and the first and second openings form an interference fit to compensate for directional changes in the first and second clamp portions.

66. The cable clamp as set forth in claim 62, further including:
   a tightening shaft having a threaded region arranged on at least a portion thereof and adapted to hingedly draw the first and second tightening regions together to form a hinged clamping of an associated cable arranged between the first and second cable channel regions.

67. The cable clamp as set forth in claim 66, wherein the first and second tightening regions include:
   first and second ear members, each ear member including an opening adapted to receive the tightening shaft.

68. The cable clamp as set forth in claim 67 wherein said first and second tightening regions collectively form a connection region of said cable clamp for suspending the cable clamp from overhead by an associated connecting element.

* * * * *